Sept. 26, 1939.  H. HARTINGER  2,174,308

OPHTHALMOMETER

Original Filed Jan. 11, 1937

Inventor:
Hans Hartinger

Patented Sept. 26, 1939

2,174,308

UNITED STATES PATENT OFFICE 2,174,308

OPHTHALMOMETER

Hans Hartinger, Jena, Germany, assignor to the firm of Carl Zeiss, Jena, Germany Original application January 11, 1937, Serial No. 119,970. Divided and this application April 3, 1939, Serial No. 265,817. In Germany January 27, 1936

1 Claim. (Cl. 88—20)

Applications have been filed in Germany, January 27, 1936, and in Switzerland, January 7, 1937.

In my copending United States application Ser. No. 119,970, filed January 11, 1937, of which the present application is a division, are described optical systems for ophthalmometers, which have two test marks coordinated to the cornea and a device for producing a double image of each of the two test-mark images reflected by the cornea and for adjusting these two double images relatively to each other.

The reciprocal adjustment of the two double images is achieved by means of the two interior of all four images, the two exterior images only disturbing the measurement.

The invention provides linearly polarizing means, which are to effect the disappearance of the said two exterior images. These means are to produce an image of each test mark through the agency of polarized light. It is advantageous to use to this effect two foils, for instance of herapathite, which polarize the light linearly and each of which is coordinated to one of the two test marks, and which are so disposed that their planes of oscillation are at right angles to each other.

In contradistinction to the embodiments described in my said copending application, the reflected images of the two test marks are doubled by doubly refracting cristals, for instance a Wollaston calcite prism. These cristals serve at the same time as analyzers. They and the said two foils (or, if other means are used for polarizing the light projecting the test marks on the cornea, such other means) will cooperate, when suitably arranged, in such a manner that the intended disappearance of the two exterior images is effected without any additional means being required.

Figure 1:
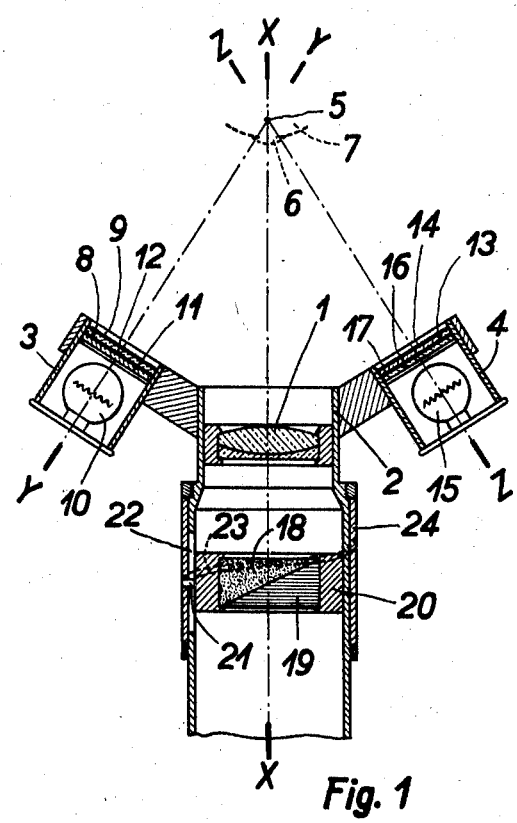
Figure 2:
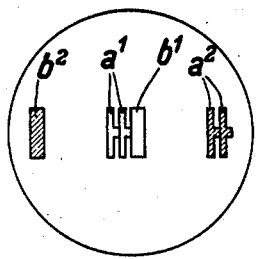

In the accompanying drawing, which illustrates the invention, Figure 1 represents in a section through the optical axis of the objective a constructional example of an ophthalmometer and Figure 2 shows the double images produced. For the sake of simplicity, the drawing does not show those well-known parts of the ophthalmometer which are not necessary for illustrating the invention, these omitted parts being the base supporting the observation device, the eye-piece of this observation device, the device for indicating the curvature to be measured, which is coupled to the device for reciprocally displacing the produced double images, and the bright mark which is disposed in the observation device and to be viewed by the eye under examination.

In Figure 1, the optical observation device has an objective 1 fixed into a tubular housing 2 which is assumed to be rotatable about the axis X—X of the said objective. To the housing 2 are fixed two tubular bodies 3 and 4 whose axes Y—Y and Z—Z, respectively, intersect each other at a point 5 corresponding approximately to the position which the centre of curvature of the cornea 6 of an eye 7 to be examined assumes relatively to the instrument. Into the tubular body 3 is fixed a glass plate 8 bearing a test mark 9 illuminated by a source of light 10. Between the glass plate 8 and another glass plate 11 is cemented a herapathite foil 12 which polarizes linearly the light emitted by the source of light 10 and whose plane of oscillation is at right angles to the plane of the drawing. Into the tubular body 4 is fixed a glass plate 13 bearing a test mark 14 illuminated by a source of light 15. Between the glass plate 13 and another glass plate 16 is cemented a herapathite foil 17 which polarizes linearly the light emitted by the source of light 15 and whose plane of oscillation coincides with the plane of the drawing. The two images due to reflection of the two test marks 9 and 14 on the cornea 6 are doubled by a Wollaston prism which consists of two calcite prisms 18 and 19 whose planes of oscillation are at right angles and parallel to the plane of the drawing, respectively. When the planes of oscillation of the two foils and the planes of oscillation of the said calcite prisms 18 and 19 assume the positions indicated above, the two exterior halves of the two double images of the two reflected test-mark images are caused to disappear. For the reciprocal adjustment of the two interior halves of the two double images, which remain visible, the Wollaston prism 18, 19 is so mounted in the tube 2 as to be displaceable along the axis X—X. The mount 20 of the prism has a pin 21 extending through a longitudinal aperture 22 of the tube 2 and engaging in a helical groove 23 of a sleeve 24 which is rotatable relatively to the tube 2. Displacements of the Wollaston prism 18, 19 along the axis X—X are effected by rotating the sleeve 24 relatively to the tube 2. The device which is to indicate the curvature of the cornea, and is omitted in the drawing, contains an index fixed to the sleeve 24 and a scale provided on the housing 2.

When using the instrument, the observer seeing in the (omitted) eye-piece of the observation device the interior halves of the two double images which the Wollaston prism 18, 19 produces of the reflected test-mark images, is to displace the Wollaston prism by rotating the sleeve 24 until the said double images of the test-mark images coincide with each other. When this coincidence is effected, the said (omitted) indicating device shows the sought curvature of the cornea.

Figure 2 represents the double images $a^1$, $a^2$ and $b^1$, $b^2$, which the Wollaston prism produces of the reflected image of the test mark 9 and the reflected image of the test mark 14. In other words, $a^1$, $b^2$ is the one, and $a^2$, $b^1$ the other double image of the two test-mark images reflected by the cornea. The drawing shows these two double images $a^1$, $b^2$ and $a^2$, $b^1$ in the reciprocal positions which these images are to assume for the measurement, and in which the two interior halves $a^1$ and $b^1$ of the two double images $a^1$, $b^2$ and $a^2$, $b^1$ are in contact with each other. The two double images $a^1$, $b^2$ and $a^2$, $b^1$ appear in the image plane of the ophthalmometer eyepiece, which is not shown in the drawing. The two exterior halves $a^2$ and $b^2$ of the two double images $a^1$, $b^2$ and $a^2$, $b^1$ are hatched in the drawing. These exterior halves are not visible to the observer, which is due to the reciprocal positions of the foils 12 and 17 and the calcite prisms 18 and 19.

I claim:

An optical system for an instrument for determining the curvature of the cornea of an eye at a definite small distance therefrom, comprising a housing, an objective disposed in said housing and forming part of a device for the observation of the eye, two test marks fixed on said housing and located symmetrically to the optical axis of said objective, two linearly polarizing foils, each of said foils being coordinated to one of said test marks for polarization of the light projecting said one test mark on the cornea, the planes of oscillation of said two foils being at right angles to each other, said objective having a focal distance enabling said objective to image in the image plane of said observation device the two test-mark images produced by the cornea, a mount disposed in the rear of said objective in said housing and adjustable along the optical axis of said objective, a Wollaston prism consisting of two rigidly interconnected calcite prisms disposed in said mount, the planes of oscillation of said calcite prisms being at right angles to each other and each of said planes being parallel to one of the two planes of oscillation of said two foils, and means for adjustment of said mount relative to said housing.

HANS HARTINGER.